Patented June 28, 1932

1,864,652

UNITED STATES PATENT OFFICE

GEORGE W. HEISE, OF LAKEWOOD, OHIO, ASSIGNOR TO NATIONAL CARBON COMPANY, INC., A CORPORATION OF NEW YORK

PRIMARY CELL AND ELECTROLYTE THEREFOR

No Drawing. Original application filed May 28, 1925, Serial No. 30,612. Patent No. 1,835,867, dated December 8, 1931. Divided and this application filed April 10, 1929. Serial No. 354,177.

This invention relates to primary cells and in particular to those of the type having a solution of caustic alkali as an electrolyte and an anode of zinc, a substance which is cathodic with respect to zinc, for example copper oxide, forming the other electrode. One of the principal objects of my invention is to improve the service characteristics of the cell by increasing the efficiency of the electrolyte, whereby it is possible to lengthen the life of the cell for a given amount of electrolyte and also to provide a higher voltage at the terminals during the life of the cell.

During the operation of the cell, the solution of caustic alkali reacts with zinc to form zinc complexes such as sodium zincate, $NaHZnO_2$. These remain in the electrolyte, which gradually becomes saturated. If the cell be used after the electrolyte is saturated with zinc-containing compounds some of the latter will crystallize out on the active electrode surfaces. This increases the internal resistance of the cell until a point is reached where the voltage at the terminals of the cell falls below that required for efficient operation.

I have found that certain substances may be added to the electrolyte which will react with the zinc-containing compound, forming an insoluble substance which precipitates out of the electrolyte. Among substances which I have found to have this beneficial effect are compounds containing the alkaline earths, such as lime and magnesia. Although these substances are substantially insoluble in solutions of caustic alkali, yet they react with the complex formed from the electrode metal, giving an insoluble compound which is precipitated in the cell container. Although this reaction may proceed somewhat slowly this does not impair the usefulness of this addition agent in practice, since these cells are ordinarily in service over long periods giving sufficient time to insure that the reaction takes place.

As a matter of convenience I ordinarily add the substance forming the insoluble precipitate when the cell is put into service; but, if deemed expedient, it may be added at a time after the beginning of operation of the cell.

Should I so desire I may carry out the present invention in conjunction with the use of other addition agents which tend to increase the solubility of the zinc-containing compound or tend to lessen the formation of adherent crystalline deposits on the electrode. An example of such a substance would be the wood extract disclosed in the copending application of Heise and Brokate, Serial No. 619,464, filed February 16, 1923, (now Patent No. 1,786,406, granted December 23, 1930.)

While the present invention has been described with particular reference to cells having zinc and copper oxide electrodes and a caustic alkali electrolyte I do not limit myself thereto, as it is also applicable to various other types of primary cells.

This application is a division of my copending application, Serial No. 30,612, filed May 15, 1925 (now Patent No. 1,835,867, granted December 8, 1931).

I claim:

1. An electrolyte for a galvanic cell of the alkaline electrolyte-zinc anode type comprising a solution of caustic alkali and an alkaline earth compound.

2. An electrolyte for a galvanic cell of the alkaline electrolyte-zinc anode type comprising a solution of caustic alkali and lime.

3. A galvanic cell comprising a zinc anode, a solid depolarizing cathode, an electrolyte comprising a solution of caustic alkali and lime in contact with said electrolyte.

In testimony whereof, I affix my signature.

GEORGE W. HEISE.